US006863523B2

(12) United States Patent
Giella

(10) Patent No.: US 6,863,523 B2
(45) Date of Patent: Mar. 8, 2005

(54) CROSSFLOW AIR HEATER BYPASS

(75) Inventor: Peter E. Giella, Flanders, NJ (US)

(73) Assignee: PPL Corporation, Allentown, PA (US)

( * ) Notice: Subject to any disclaimer, the term of this patent is extended or adjusted under 35 U.S.C. 154(b) by 102 days.

(21) Appl. No.: 10/183,449

(22) Filed: Jun. 28, 2002

(65) Prior Publication Data

US 2004/0002029 A1 Jan. 1, 2004

(51) Int. Cl.$^7$ .......................... F23L 15/00; F23D 17/00
(52) U.S. Cl. ...................... 431/11; 431/215; 432/182; 165/7; 165/134.1; 165/921
(58) Field of Search .................. 431/6, 11, 215; 432/182; 165/7, 134.1, 921

(56) References Cited

U.S. PATENT DOCUMENTS 4,424,857 A * 1/1984 Linde ........................ 165/7
4,932,464 A * 6/1990 Lee et al. .................. 165/7

* cited by examiner

Primary Examiner—Ira S. Lazarus
Assistant Examiner—James G. Barrow
(74) Attorney, Agent, or Firm—Covington & Burling

(57) ABSTRACT

A boiler system includes combustion air conduit for directing the flow of combustion air through a first air heater (e.g., A-side heater) to a boiler and flue gas conduit for directing the flow of flue gas generated by the boiler to a second air heater (e.g., B-side heater). The combustion air conduit is configured to direct the majority of the combustion air to the first air heater, and the flue gas conduit is configured to direct the majority of the flue gas from the boiler to the second air heater.

20 Claims, 4 Drawing Sheets

CROSSFLOW AIR HEATER BYPASS

BACKGROUND OF THE INVENTION

1. Field of the Invention

The present invention relates to a system and method for improving the operation of a boiler.

2. Description of the Background

FIG. 1 shows a conventional boiler system that includes two sets of fans, an "A" set and a "B" set. The A-side set of fans includes forced draft fan 101a, which includes a silencer 105a for reducing noise. The forced draft fan 101a forces combustion air through combustion air conduit 109. Combustion air conduit 109 includes duct sections 111a, 111b, 111c, 111d, 111e, and 111f, which are shown as solid lines with the arrows showing the direction in which combustion air from the forced draft fan 101a is forced. The combustion air conduit 109 also includes shutoff damper 113a, which can be used to reduce or shut off completely the flow of combustion air between duct sections 111a and 111b.

Air preheater 115a is located between duct sections 111b and 111c. Air preheater 115a heats combustion air flowing from fan 101a before the air reaches duct section 111c.

Duct sections 111d and 111e branch from duct section 111c. Duct section 111d directs combustion air into the A-side air heater 119a. Air heater 119a is divided into two parts, as shown conceptually, by the dashed line in FIG. 1. Air heater 119a may be any suitable device for heating combustion air, such as a CE LJUNGSTROM regenerative air preheater, for example. An exemplary air heater 119a may include a large disk of stacked steel baskets that rotate from the hot side of the air heater 119a toward the cold side of the air heater 119a. The hot side of the air heater 119a (conceptually shown on the left of the dashed line bisecting air heater 119a in FIG. 1) receives hot flue gas. The cold side of air heater 119a (shown on the right of the dashed line bisecting air heater 119a in FIG. 1) receives combustion air via the duct section 111d of the combustion air conduit 109. Air heater 119b a heats the combustion air 119a it receives from duct section 111d. The combustion air heated by air heater 119a is forced out of air heater 119a and is directed by duct section 111f if to the boiler 121, which burns a mixture of combustion air received from duct section 111f and fuel. The burning of fuel and combustion air generates hot flue gas, which is directed away from boiler 121 by flue gas conduit 129, shown as a dashed line. Flue gas conduit 129 includes duct section 123a which directs flue gas from boiler 121 to the hot side of the A-side air heater 119a. Flue gas conduit 129 also includes duct section 123b for directing flue gas away from the air heater 119a, duct sections 123c and 123j, which branch from duct section 123b, shutoff damper 127a for controlling the volume of flue gas flowing between duct sections 123c and 123d, duct section 123d for directing the flue gas to an A-side induced flow fan 131a; duct section 123e for directing flue gas away from induced draft fan 131a, shutoff damper 133a; for controlling the volume of flue gas flowing between duct sections 123c and 123f and duct sections 123f and 123g for directing flue gas toward the stack 135.

The A-side induced draft fan 131a pulls flue gas away from the boiler 121 in the direction shown by the arrows along flue gas conduit 129. Induced draft fan 131a may be implemented by any suitable fan for that purpose. Shutoff dampers 127a and 133a perform the same or similar function as shutoff damper 113a. Shutoff dampers 115a, 127a, and 133a may be implemented by any suitable device for shutting off, opening, and varying the flow of air and/or gases through conduit.

The B-side of the boiler system in FIG. 1 includes B-side forced draft fan 101b, the silencer 105b of the forced draft fan 101b, air preheater 115b, B-side air heater 119b, B-side induced draft fan 131b, and shutoff dampers 113b, 127b, and 133b. These B-side components may be implemented in the same manner as the corresponding A-side components and perform the same or similar function for the B-side as the A-side components perform for the A-side.

Combustion air conduit 109 includes duct section 111g for directing the flow of combustion air from the fan 101b to the shutoff damper 113b, duct section 111h for directing combustion air from the shutoff damper 113b to the air preheater 115b, duct section 111i for directing air away from the air preheater 115b, duct sections 111k and 111j which branch from duct section 111i to duct section 111e and to air heater 119b respectively, and duct section 111l which directs combustion air from the air heater 119b to the boiler 121. Together, the duct sections 111e and 111k form combustion air crossover conduit, which allows combustion air to flow between the A-side and the B-side of the boiler system.

Flue gas conduit 129 includes duct section 123h for directing flue gas from the boiler 121 to the hot side of the air heater 119b (conceptually shown as the portion of the air heater 119b on the right side of the dotted line that bisects the air heater 119b), duct section 123i for directing flue gas from the air heater 119b, duct section 123k which branches from duct section 123i and directs flue gas toward duct section 123j, duct section 123l which branches from duct section 123i and directs flue gas toward the shutoff damper 127b, duct section 123m for directing flue gas from the shutoff damper 127b to the induced air fan 131b, duct section 123n for directing flue gas from the fan 131b to the shutoff damper 133b, and duct section 123o for directing flue gas to the duct section 123g and eventually on to the stack 135. The shutoff dampers 113b, 127b, and 133b may also be considered part of the flue gas conduit 129 and regulate flow in the same manner as the corresponding counterpart shutoff dampers on the A-side (i.e., shutoff dampers 113a, 127a, and 133a). The duct sections 123j and 123k form flue gas crossover conduit for permitting the flow of flue gas between the A-side and the B-side of the boiler system in FIG. 1.

During normal operation, the forced draft fans 101a and 101b push combustion air through the cold sides of the air heaters 119a and 119b and toward the boiler 121. The induced draft fans 131a and 131b pull flue gas away from the boiler through the hot sides of the air heaters 119a and 119b, and toward the stack 135. A problem with the operation of this and other boiler systems is that acid, such as sulphuric acid, condenses in the flue gas. In this respect, the acid dew point is important because when the flue gas and components in contact with the flue gas have a temperature below the acid dew point, acid condenses out of the flue gas. Condensed acid corrodes the components of the boiler system that it contacts and also increases the opacity of the flue gas. If the opacity is regulated (by state or federal agencies, for example), then it is normally desirable to decrease the opacity of the flue gas.

As the boiler system starts up or shuts down, the flue gas temperature in the air heaters 119a and 119b as well as the flue gas output ductwork temperatures (i.e., the portions of the flue gas conduit 129 downstream of the air heaters 119a and 119b and the induced draft fans 131a and 131b) are below the sulphuric acid dew point. As noted, this allows sulphuric acid to condense and collect on the colder surfaces. During startup and initial unit loading, this condensed sulphuric acid is re-volatized when flue gas temperature rises to approximately 240°. At this temperature, the re-volatized sulphuric acid is a combination of fine droplets and gas. The fine droplets cause elevated opacity in the stack 135. As the temperature continues to rise above the acid dew point (approximately 270° F.) all of the sulphuric acid becomes gaseous and no longer contributes to opacity.

Several solutions for reducing sulphuric acid mist have been proposed. One such proposal is to use a chemical additive that reduces the formation of sulphuric acid. These additives, such as magnesium-oxide, are injected into the flue gas during startup and shutdown of the boiler system. This approach has several problems, not the least of which is that the use of additives may pose environmental risks and/or be prohibited by law.

Another approach is to increase the temperature of the combustion air and/or the flue gas during startup and shutdown. These techniques attempt to reduce the effect of the ambient temperature on the time it takes to warm the flue gas above the acid dew point. An example of one such system is described in U.S. Pat. No. 4,932,464, which is incorporated herein by reference in its entirety. Other techniques for increasing flue gas temperature involve air heater bypass. Air heater bypass may be implemented, for example, by causing combustion air to flow around, rather than through, an air heater. For example, extra ductwork could be added to the boiler system of FIG. 1 to cause combustion air to flow directly from duct section 111d to 111f and from duct section 111j to duct section 111l, without passing through either of the air heaters 119a and 119b. Shutoff dampers may be used along this extra duct work to vary the amount of bypass. Air heater bypass causes the air heaters to increase in temperature as a result of receiving less of the combustion air, which is relatively cooler than the hot flue gasses received on the hot sides of the air heaters. This solution, however, is costly because it requires extra ductwork to be able to control the bypass of air flow around the air heaters. Additionally, it may not be feasible, or even possible, to retrofit existing boiler systems with the ductwork required to enable air heater bypass.

SUMMARY OF THE INVENTION

The present invention provides a boiler system and method for operating a boiler system. The system on which the method is based, includes combustion air conduit for directing the flow of combustion air through a first air heater (e.g., A-side air heater) to a boiler and flue gas conduit for directing the flow of flue gas generated by the boiler to a second air heater (e.g., B-side air heater). The combustion air conduit is configured to direct the majority of the combustion air to the first air heater, and the flue gas conduit is configured to direct the majority of the flue gas from the boiler to the second air heater.

According to one embodiment, the combustion air conduit directs all of the combustion air to the first heater, and the flue gas conduit directs all of the flue gas through the second air heater. In other configurations, the flue gas conduit and the combustion air conduit may be configured to direct anywhere from 50 to 100% of their flow to either the first or second fan.

According to another embodiment, different combustion air conduit and flue gas conduit configurations are achieved through the use of shutoff dampers positioned along crossover conduits. With such embodiments, one such crossover conduit may form part of the combustion air conduit and a second crossover conduit may form part of the flue gas conduit.

Accordingly, the present invention advantageously emulates an air heater bypass. In some instances, it is not even necessary to retrofit an existing boiler system with new ductwork to achieve advantages of the present invention. The present invention advantageously increases flue gas temperatures, which in turn reduces condensation, including sulfuric acid mist in the flue gas and along the path of the flue gas. The reduction in condensation reduces corrosion and thereby prolongs the life of the boiler system, and in particular, the portions of the boiler system that are most susceptible to corrosion caused by acid condensation. The reduction in acid mist also causes a corresponding reduction in the opacity of the flue gas in the lower portions of the stack. Thus, sensors or other devices for measuring opacity will not be affected by the acid mist and therefore will not incorrectly detect the acid mist as particulate waste.

Additionally, the present invention virtually eliminates the effect of the ambient temperature on the time it takes to warm up the back end temperature of the boiler. Accordingly, there is minimal time difference between summer and winter heat-up times. The present invention is also used when the boiler is shut down to keep the air heater and ductwork temperatures above the acid dew point during the time that fuel is being combusted. This also minimizes the corrosion of components and sulfuric acid condensation which may cause increases in opacity during the next startup and initial loading period. In certain implementations of the present invention, when the boiler is shut down, combustion stops while the flue gas temperature is still above the acid dew point.

Lastly, the present invention also allows the flue gas to remain hot or above the acid dew point when the unit is at minimum generation. This reduces opacity and corrosion when the boiler system is at minimum load.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
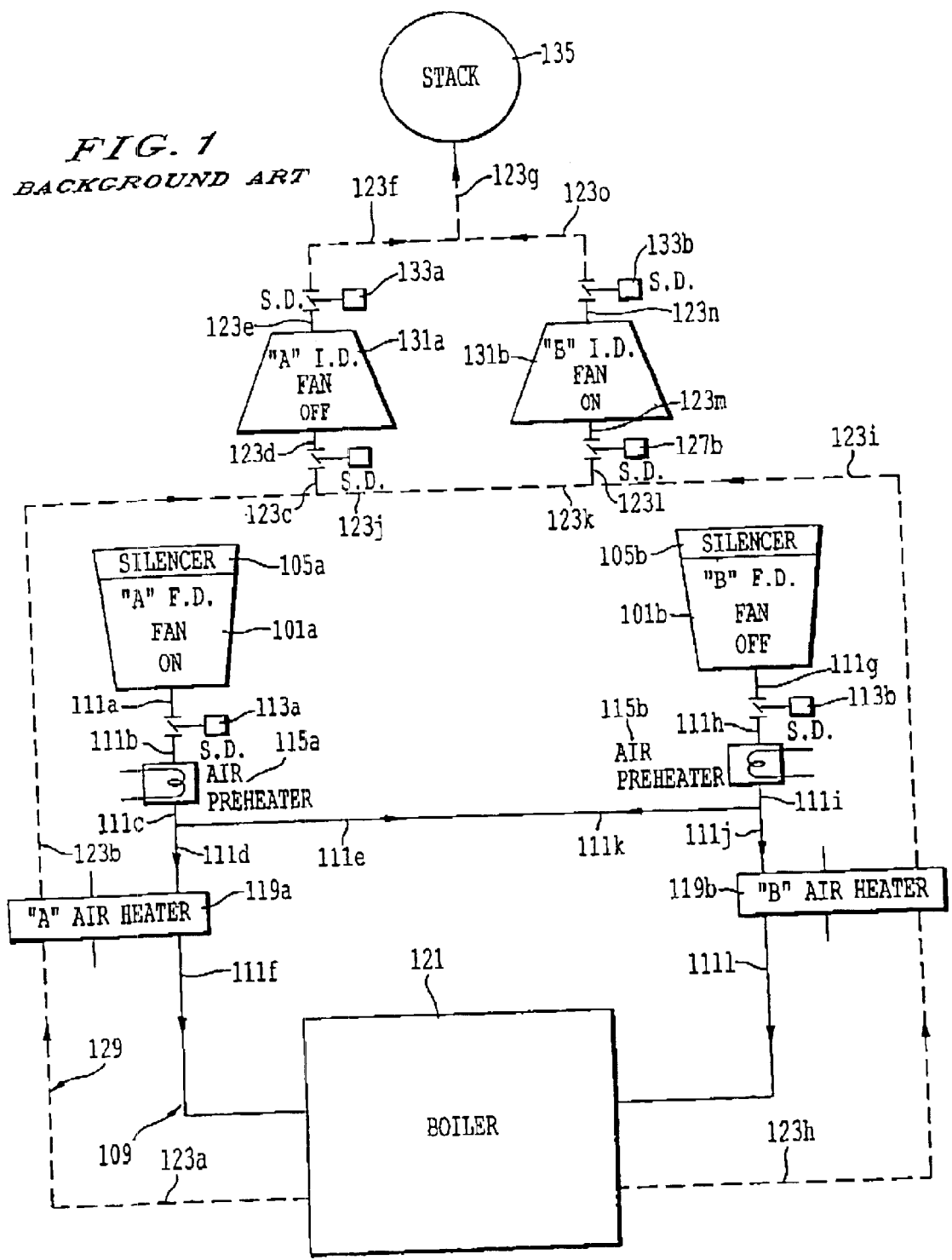
FIG. 1 is a schematic illustration of a conventional boiler system.
Figure 2:
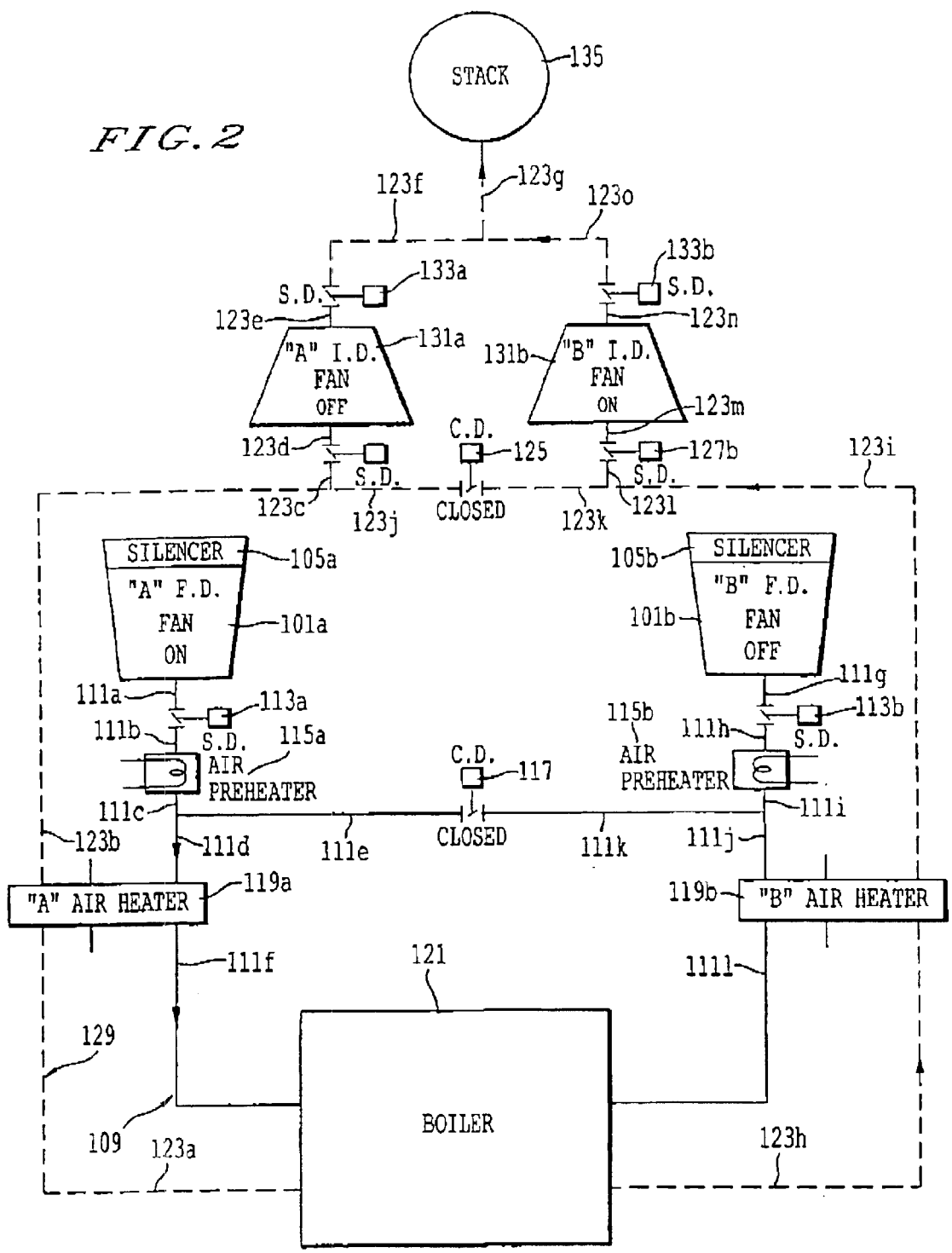
FIG. 2 is a schematic illustration of a boiler system configured in accordance with one embodiment of the present invention.

Referring now to the drawings, wherein like reference numerals designate identical or corresponding parts throughout the several views, and more particularly, to FIG. 2 thereof, there is shown a conceptual diagram of an exemplary boiler system of the present invention. According to FIG. 2, the A-side of the boiler system includes forced draft fan 101a, the A air heater 119a, and the induced draft fan 131a. The B-side of the boiler system of FIG. 1 includes forced draft fan 101b, air heater 119b, and induced draft fan 131b.

According to one embodiment, the air heaters 119a and 119b work by passing flue gas on the hot side (the side to the left of the dashed line bisecting air heater 119a and the side to the right of the dashed line bisecting air heater 119b) and bypassing combustion air on the cold side, which is opposite the hot side. The air heaters 119a and 119b are designed to absorb waste heat from the flue gas flowing through the flue gas conduit 129 and transfer this heat to the relatively cold combustion air flowing through the combustion air conduit 109. The transfer of heat is achieved by continuously rotating heat transfer elements within the air heaters 119a and 119b. In one embodiment, these heat transfer elements are specially formed metal plates, and thousands of these elements are spaced and compactly arranged within 24 sector-shaped compartments of a radially divided cylindrical shell, called a rotor, within each of the air heaters 119a and 119b.

The housing surrounding the rotor is provided with duct connections at both ends, and is sealed by radial and circumferential sealing members, forming an air passage through one-half of the air heater (the cold side) and a gas passage through the other half of the air heater (the hot side). As the rotor slowly revolves the mass of elements alternately through the gas and air passages, heat is absorbed by the element surfaces passing through the hot stream of flue gas; then, as the element surfaces are carried through the stream of combustion air on the cold side, they release the stored heat and increase the temperature of the combustion air flowing through the combustion air conduit 109. The cooler the ambient air, the more heat is extracted from the flue gas, and the longer It takes to warm up the air heaters 119a and 119b and the portions of the flue gas conduit 129 that lead from the air heaters 119a and 119b to the stack 135. A regenerative type air heater is described in "Combustion Fossil Power Systems, A Reference Book on Fuel Burning and Steam Generation," edited by Joseph G. Singer, 3$^{rd}$ ed., Combustion Engineering. Inc., Windsor, Conn., 1981, which is incorporated herein by reference in its entirety. As mentioned previously, the air heater 119a and 119b may be implemented by LJUNGSTROM regenerative air preheaters (e.g., Model #30-VI-57-1/2) or any other suitable device.

As shown in FIG. 2, an example of the inventive boiler system configuration may be implemented by closing crossover damper 117 along the combustion air crossover formed by duct sections 111e and 111k and by closing the crossover damper 125 positioned along the flue gas crossover formed by duct sections 123j and 123k. Additionally, the A-side forced draft fan 101a is turned on while the B-side forced draft fan 101b is turned off. However, both the A-side and B-side air heaters 119a and 119b are used in this implementation. With the crossover damper 117 closed, the B-side air heater 119b receives no combustion air since the B-side forced draft fan 101b is off. The dampers 113a, 113b, 117, 125, 133a, and 133b maybe implemented as electronically controlled multi-leaf louver type dampers or any other suitable devices for regulating air or gas flow.

On the other hand, the A-side induced draft fan 131a is turned off, the B-side induced draft fan 131b is turned on, and the crossover damper 125 is closed. This structure causes all of the flue gas to be extracted through the B-side air heater 119b by the B-side induced draft fan 131b. Thus, the A-side air heater 119a receives all of the combustion air, while the B-side air heater 119b receives all of the flue gas. The configuration in FIG. 2 effectively causes all of the combustion air to bypass the B-side air heater 119b and causes all of the flue gas to bypass the A-side air heater 119a. In alternate embodiments of the invention, the various dampers shown in FIG. 2 may be altered to cause different effective amounts of bypass, infinitely variable between 0 and 100%, of the combustion air and/or the flue gas.

Figure 3:
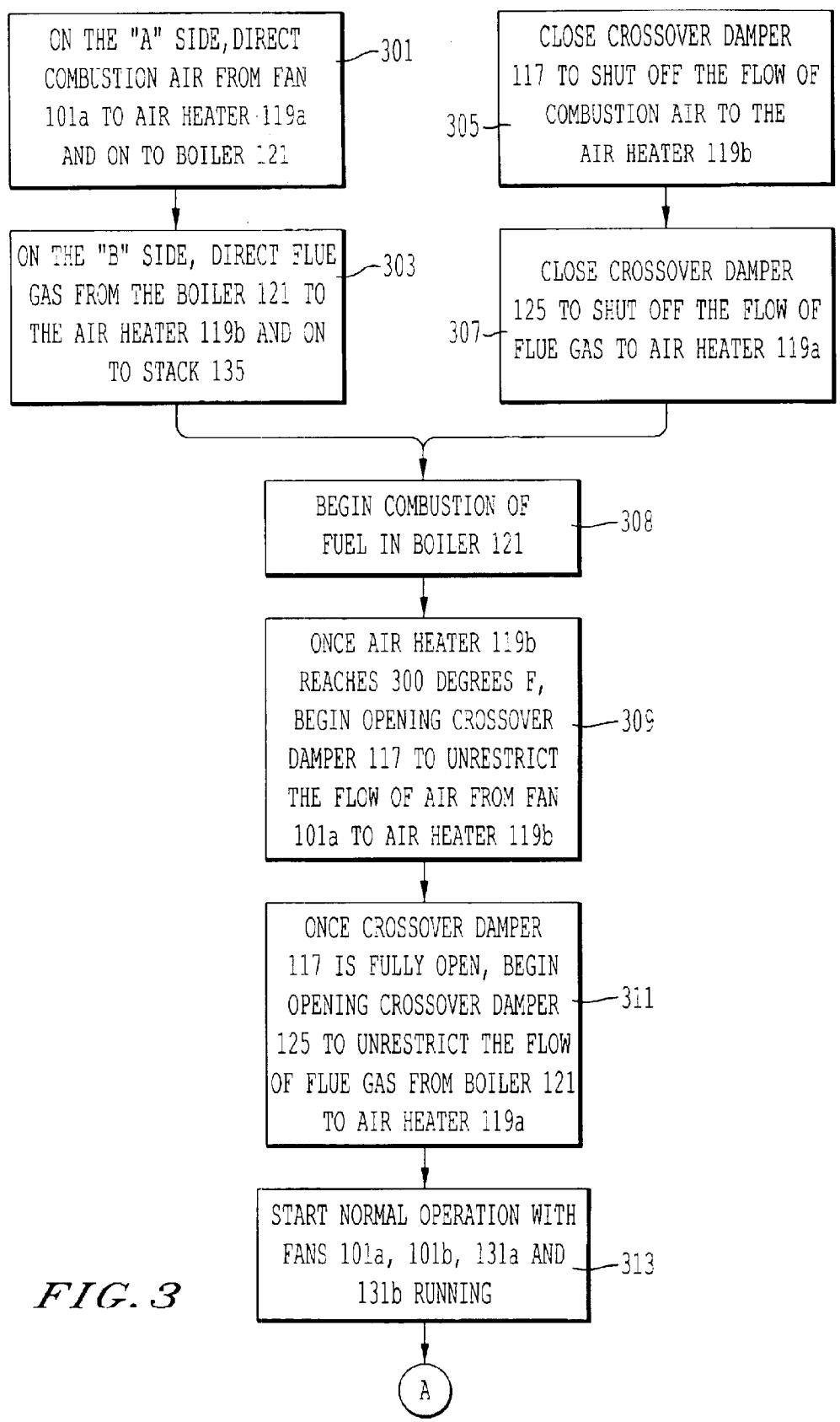
FIG. 3 is a flow chart illustrating boiler system startup according to an embodiment of the invention.

FIG. 3 describes the method steps for implementing the present invention according to one embodiment. In step 301, the A-side forced draft fan 101a is turned on, and in step 303, the B-side induced draft fan 131b is turned on to extract flue gas from the boiler 121 to the air heater 119b and on to the stack 135. Fans 101b and 131a remain off. In step 305, the crossover damper 117 is closed to direct 100% of the flow of combustion air from the fan 101a to the air heater 119a and to shut off the flow of combustion air to the air heater 119b. In step 307, the crossover damper 125 is closed to direct 100% of the flow of flue gas from the boiler 121 to the air heater 119b and to prevent flue gas from flowing through air heater 119a. Once steps 301, 303, 305 and 307 are performed, the B-side air heater 119b will increase in temperature rapidly because it receives none of the relatively cool combustion air flowing through the combustion air conduit 109. As a result, the flue gas flowing through the flue gas conduit 129 and all components in contact with the flue gas increase in temperature relatively quickly relative to a conventional boiler system. Thus, the flue gas and the components in contact with the flue gas are raised above the acid dew point much more quickly than in a conventional boiler system, and as a result, acid mist, opacity, and corrosion is reduced.

Steps 301, 303, 305, and 307 may be performed in any order; however, in one preferred embodiment, steps 305 and 307 are performed prior to steps 301 and 303, and combustion begins in step 308 after steps 301, 303, 305, and 307 are complete.

Once the gas exiting air heater 119b reaches 300° to 320° F., in step 309 the crossover damper 117 is throttled open to unrestrict the flow of air from fan 101a to air heater 119b. The crossover damper 117 is throttled open to maintain the gas temperature of 300° to 320° F. until the crossover damper 117 is 100% open. It should be noted that different temperatures may be preferred in different applications. For example, if the distance from the air heater 119b to the stack 135 increases, then the temperature of gas exiting the air heater 119b may have to be increased during this step to account for the additional cooling time of the gas on its way to the stack 135.

Once the crossover damper 117 is 100% open, in step 311 the crossover damper 125 is throttled open to unrestrict the flow of flue gas from boiler 121 to air heater 119a. The crossover damper 125 is throttled open such that the air heater 119b output temperature of 300° to 320° F. is maintained while the air heater 119a is warmed.

Once the crossover damper 125 is all the way open, in step 313, the forced draft fan 101b and the induced draft fan 131a are started and normal operation begins.

Figure 4:
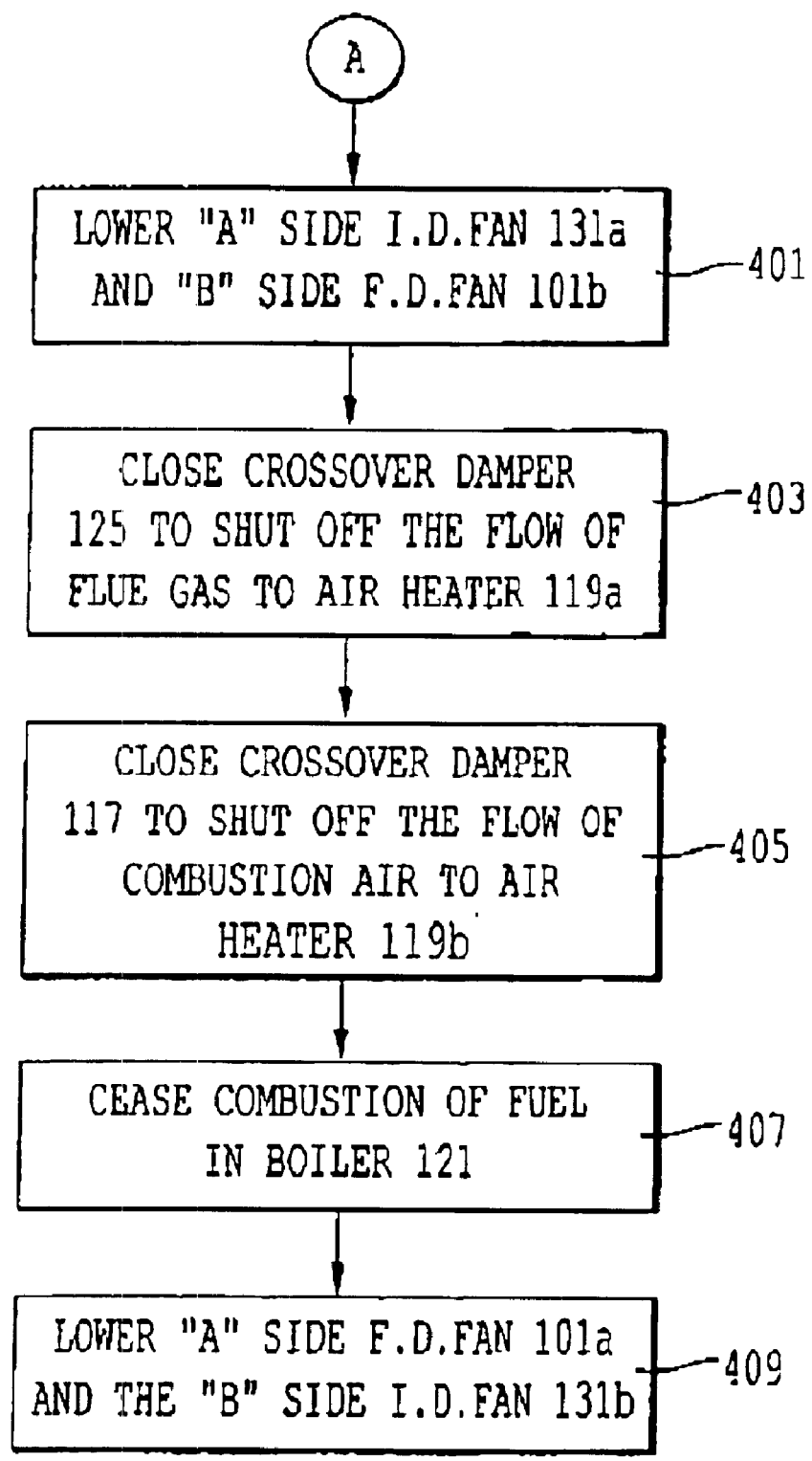
FIG. 4 is a flow chart describing boiler system shutdown according to an embodiment of the invention.

FIG. 4 shows how the boiler system of FIG. 2 may be shut down according to one embodiment. Shut down is generally the reverse of start up. In step 401. the flows of induced draft fan 131a and the forced draft fan 101b are lowered. Depending on the type of fan, this may be accomplished by adjusting the pitch of the fans, by closing control dampers of the fans, or adjusting the speeds of the fans, for example. Then, in step 403 the crossover damper 125 is throttled closed to shut off the flow of flue gas to the air heater 119a. Once the crossover damper 125 is 100% closed, in step 405 the crossover damper 117 is throttled closed to shut off the flow of combustion air to the air heater 119b.

As before, the crossover dampers 117 and 125 are throttled in steps 403 and 405 to maintain the temperature of the gas leaving the air heater (in this case, the air heater 119b) at 300° to 320° F. Once the crossover damper 117 is throttled 100% closed, combustion of fuel in the boiler 121 is ceased in step 407. Then the remaining active fans, the A-side forced draft fan 101a and the B-side induced draft fan 131b, are lowered. The result of shutting down the system in the manner depicted in FIG. 4 is that the temperature of air heater 119b increases rapidly so that the flue gas remains above the dew point for as long as possible after the supply of fuel to the boiler is stopped in step 407.

Accordingly, it can be appreciated that the present invention provides a novel system and method for increasing flue gas temperatures during startup and shutdown without requiring additional hardware necessary for conventional air heater bypass. Further, if the combustion air crossover conduit and the flue gas crossover conduit in an existing boiler system, such as that shown in FIG. 1, are already fitted with crossover dampers 117 and 125, then no additional hardware is required. The only necessary changes are to alter the configuration of the crossover conduits using the crossover dampers to obtain the inventive configuration. If crossover dampers 117 and 125 are not present, then the flow of air and gas can be manipulated according to the invention by simply controlling the flow of air with the forced draft fans 101a and 101b and the induced draft fans 131a and 131b, for example. Thus, there are numerous, if not infinite, number of ways the present invention could be implemented.

Testing of the inventive system yielded favorable results when compared to a conventional boiler system. Using the invention, on a hot startup it took only 5–8 minutes to heat up the back end temperatures above the acid dew point, compared to 4.5 hours with a conventional system. On a cold startup, it took only 1.5 to 2 hours to heat up the back end temperatures above the acid dew point, compared to 9 hours with a conventional system. Thus, the invention makes it possible for a relatively inexpensive modification to a conventional boiler system to greatly reduce acid mist, corrosion, and opacity.

Obviously, numerous modifications and variations of the present invention are possible in light of the above teachings. For example, it is not always necessary to use induced draft fans in a boiler system. On the other hand, it is also possible to add booster fans or use more than two induced draft fans with a single boiler system or unit. As another example, additional ductwork, including various dampers, may be added to achieve a higher level of variability or control of the flow in either the combustion air conduit 109 or the flue gas conduit 129. It is therefore to be understood that within the scope of the appended claims, the invention may be practiced otherwise than as specifically described herein.

What is claimed is:

1. A system comprising:
   (a) a boiler configured to receive combustion air and to generate flue gas as a byproduct of burning fuel mixed with the combustion air;
   (b) combustion air conduit configured to direct the flow of the combustion air to the boiler;
   (c) flue gas conduit configured to direct the flow of the flue gas away from the boiler;
   (d) a first fan coupled to the boiler and configured to force combustion air through the combustion air conduit to the boiler;
   (e) a first air heater coupled to the first fan and to the boiler via the combustion air conduit and positioned along the combustion air conduit between the first fan and the boiler; and
   (f) a second air heater coupled to the boiler via the flue gas conduit, wherein the flue gas conduit is configured to direct more flue gas to the second air heater than to the first air heater.

2. A system according to claim 1, wherein the flue gas conduit is configured to direct at least 75% of the flue gas from the boiler to the second air heater.

3. A system according to claim 2, wherein the flue gas conduit is configured to direct all of the flue gas from the boiler to the second air heater.

4. A system according to claim 1, wherein the combustion air conduit comprises a flow control device to direct more combustion air to the first air heater than to the second air heater.

5. A system according to claim 4, wherein the flow control device directs at least 75% of the combustion air from the first fan to the first air heater.

6. A system according to claim 5, wherein the flow control device directs all of the combustion air from the first fan to the first air heater.

7. A system according to claim 1, wherein the flue gas conduit couples the first air heater to the second air heater and further comprises: (g) flue gas crossover conduit between the first air beater and the second air heater.

8. A system according to claim 7, wherein the flue gas crossover conduit comprises:
   (h) a crossover damper.

9. A system according to claim 7, further comprising:
   (h) a second fan coupled to the boiler and the second air heater by the conduit and configured to force combustion air through the combustion air conduit to the boiler, the second air heater being positioned between the boiler and the second fan along the combustion air conduit;
   wherein, the combustion air conduit comprises:
   (i) combustion air crossover conduit extending from a point between the first fan and the first air heater to a point between the second fan and the second air heater.

10. A system according to claim 9, wherein the combustion air crossover conduit comprises:
   (j) a crossover damper.

11. A method comprising:
   (a) directing a flow of combustion air through a first air heater to a boiler;
   (b) directing a flow of flue gas generated by the boiler to a second air heater,
   (c) restricting the amount of combustion air received by the second air heater to cause the first air heater to receive the majority of the combustion air; and
   (d) restricting the amount of flue gas received by the first air heater from the boiler to cause the second air heater to receive the majority of the flue gas from the boiler.

12. A method according to claim 11, wherein step (c) comprises:
   (e) shutting off completely the flow of combustion air to the second air heater.

13. A method according to claim 12, wherein step (d) comprises:
   (f) shutting off completely the flow of flue gas to the first air heater.

14. A method according to claim 13, further comprising:
   (g) unrestricting the amount of combustion air received by the second air heater to cool the second air heater.

15. A method according to claim 14, further comprising:
   (h) unrestricting the amount of flue gas received by the first air heater from the boiler to heat the first air heater.

16. A method according to claim 11, further comprising:
   (e) shutting down the boiler subsequent to steps (c) and (d).

17. A system comprising:
   (a) means for directing a flow of combustion air through a first air heater to a boiler;

(b) means for directing a flow of flue gas generated by the boiler to a second air heater;
(c) means for restricting the amount of combustion air received by the second air heater to cause the first air heater to receive the majority of the combustion air; and
(d) means for restricting the amount of flue gas received by the first air heater from the boiler to cause the second air heater to receive the majority of the flue gas from the boiler.

18. A system according to claim 17, wherein the (c) means for restricting comprises means for shutting off completely the flow of combustion air to the second air heater.

19. A system according to claim 18, wherein the (d) means for restricting comprises means for shutting off completely the flow of flue gas to the first air heater.

20. A system according to claim 17, wherein the (d) means for restricting comprises means for shutting off completely the flow of flue gas to the first air heater.

\* \* \* \* \*